United States Patent
Busto Llavona et al.

(10) Patent No.: US 8,547,074 B2
(45) Date of Patent: Oct. 1, 2013

(54) SEQUENTIAL SWITCHING SHUNT REGULATOR CELL WITH NON-REDUNDANT RECTIFIER

(75) Inventors: Leticia Busto Llavona, Aviles (ES); Ferdinando Tonicello, Leiden (NL)

(73) Assignee: Agence Spatiale Europeenne, Paris (FR)

( * ) Notice: Subject to any disclaimer, the term of this patent is extended or adjusted under 35 U.S.C. 154(b) by 340 days.

(21) Appl. No.: 12/954,957

(22) Filed: Nov. 29, 2010

(65) Prior Publication Data

US 2011/0127972 A1   Jun. 2, 2011

(30) Foreign Application Priority Data

Nov. 27, 2009   (EP) .................................... 09290886

(51) Int. Cl.
*G05F 1/10* (2006.01)
(52) U.S. Cl.
USPC .............. 323/235; 323/906; 363/65; 320/101
(58) Field of Classification Search
USPC ......... 323/222, 224, 282–290, 906; 320/101, 320/117, 122, 128, 132, 157; 307/19, 22, 307/30, 126, 82
See application file for complete search history.

(56) References Cited

U.S. PATENT DOCUMENTS

| | | | |
|---|---|---|---|
| 4,186,336 A | | 1/1980 | Weinberg et al. |
| 5,504,418 A | * | 4/1996 | Ashley ........................... 323/282 |
| 5,570,277 A | * | 10/1996 | Ito et al. ........................... 363/19 |
| 5,751,530 A | * | 5/1998 | Pelly et al. ....................... 361/56 |
| 6,157,161 A | * | 12/2000 | Canter et al. ................... 320/101 |
| 6,181,115 B1 | | 1/2001 | Perol et al. |
| 6,657,419 B2 | * | 12/2003 | Renyolds ....................... 323/285 |
| 6,690,150 B2 | * | 2/2004 | Pelletier et al. ............... 323/324 |
| 6,963,190 B2 | * | 11/2005 | Asanuma et al. ............. 323/283 |
| 7,999,504 B2 | * | 8/2011 | Diraison et al. .............. 320/101 |
| 2008/0129119 A1 | | 6/2008 | Tonicello |

FOREIGN PATENT DOCUMENTS

| | | |
|---|---|---|
| EP | 1 486 845 | 1/1980 |
| EP | 0 614 136 | 9/1994 |
| FR | 2 908 939 | 5/2008 |
| WO | 99/28801 | 6/1999 |

OTHER PUBLICATIONS

O'Sullivan et al., "The Sequential Switching Shunt Regulator $S^3R$", Proceedings of the Third ESTEC Spacecraft Power Conditioning Seminar, Noordwijk, The Netherlands, Sep. 21-23, 1977, pp. 123-131.

C. Delepaut et al., "Current Limitation Techniques in a S3R Power Cell", Proceedings of the European Space Power Conference, Graz, Austria, Aug. 23-27, 1993, pp. 61-66.

JP Castiaux et al., "Power Conditioning Units for High Power Geostationary Satellites", Power Electronics Specialists Conference, 1997. PESC '97 Record., 28th Annual IEEE St. Louis, MO, USA Jun. 22-27, 1997 vol. 1, pp. 722-733.

* cited by examiner

Primary Examiner — Rajnikant Patel
(74) Attorney, Agent, or Firm — Clark & Brody

(57) ABSTRACT

A sequential switching shunt regulator cell comprising: a power line (PL) for connecting a power source (SA) to a power bus (PB); a shunting (SSW) switch for shunting said power line; and driving means (DM) for opening or closing said shunting switch depending on an error signal (MEA) indicative of a voltage level of said power bus; characterized in that it also comprises: a non-redundant rectifier ($D_3$) connected in series to said power line for disconnecting the power bus from the shunting switch when the latter is closed; and a fault detector (FD) for detecting a short-circuit fault condition of said non-redundant rectifier, and for opening the shunting switch in reply to said condition. Advantageously, the rectifier can be a synchronous rectifier. A solar power regulator comprising a plurality of solar arrays connected to a power bus through respective sequential switching shunt regulator cells of the kind described above.

11 Claims, 4 Drawing Sheets

SEQUENTIAL SWITCHING SHUNT REGULATOR CELL WITH NON-REDUNDANT RECTIFIER

Figure 1:
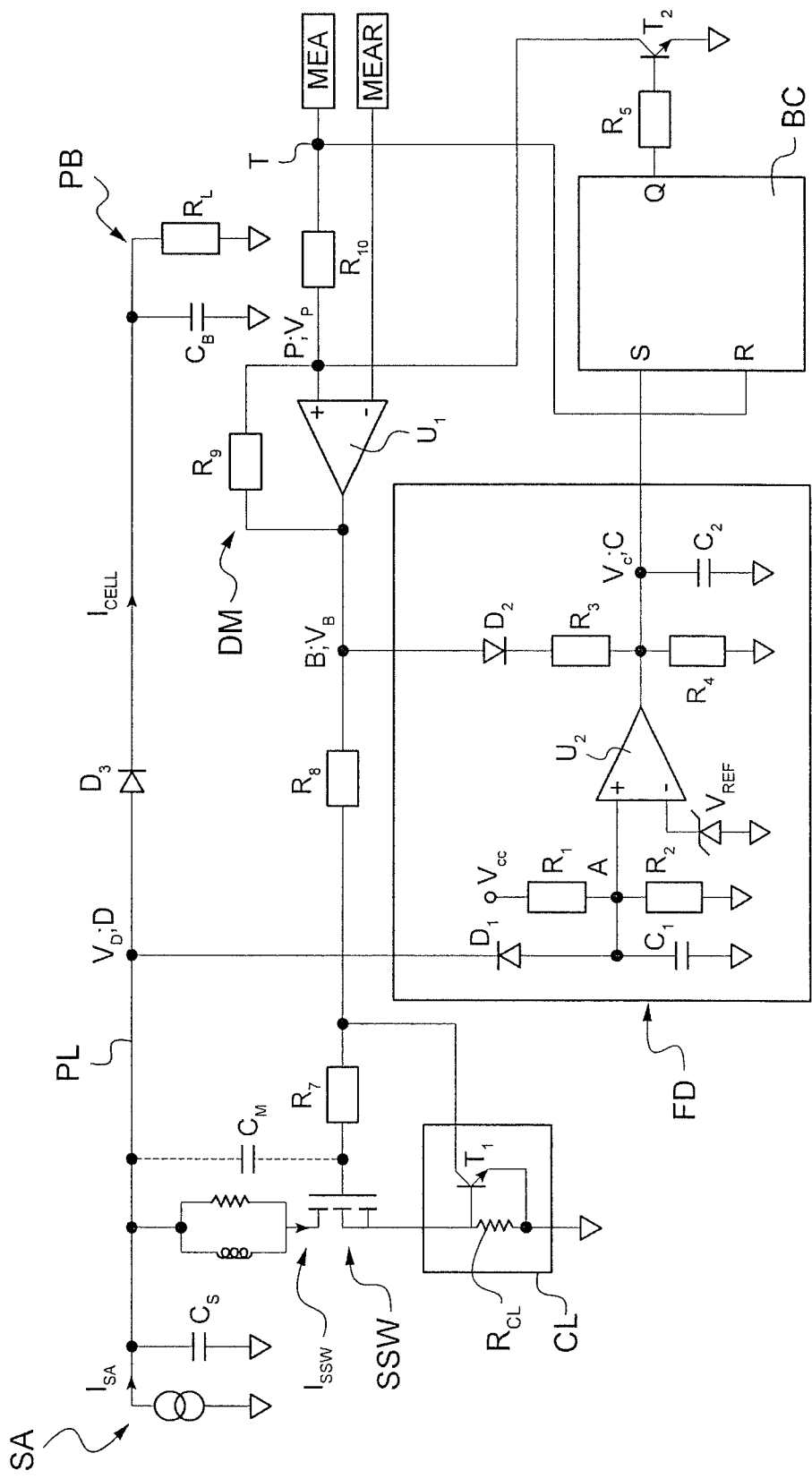

The invention relates to an improved sequential switching shunt regulator cell, and to a solar power regulator comprising a plurality of said cells.

The "sequential switching shunt regulator" or "S3R" is a well-known architecture for regulating the voltage of a power bus fed by a plurality of power sources, e.g. solar arrays. This architecture has been described for the first time in the paper by D. O'Sullivan and A. Weinberg "The Sequential Switching Shunt Regulator $S^3R$", Proceedings of the Third ESTEC Spacecraft Power Conditioning Seminar, Noordwijk, The Netherlands, 21-23 Sep. 1977, pages 123-131.

A S3R regulator comprises a plurality of cells, each connecting a respective power source (solar array) to a power bus. Each cell comprises a controlled shunting switch for shunting the power source, and driving means for driving said shunting switch. The driving means open and close the shunting switch depending on the power bus voltage level. When said voltage level exceeds a first threshold, the driving means close the switch, thus shunting the power source; when said voltage level falls below a second threshold (lower than said first threshold, in order to provide some hysteresis), the driving means open the switch so that the power source can feed the power bus. A diode is provided in order to avoid that the closure of the switch results in shunting of the whole power bus, and not only of one power source.

In a S3R regulator, the different cells are provided with different first and second threshold values. In that way, at any time, a first set of cells will have an open switch and therefore will feed the power bus; a second set of cell will have a closed switch and therefore will not provide any power to the power bus; and a single cell will be switching in order to maintain the power bus voltage level within a predetermined range. If the power provided by the power sources decreases (e.g. due to a reduction of illumination, if said sources are solar arrays) or the loading of the power bus increases, some cells will switch from the "shunt" condition to the "open" condition. The opposite will happen if the power provided by the power sources increases or if the loading of the power bus decreases.

An improvement of the S3R concept, known as "sequential switching shunt series regulator" or "S4R" is disclosed by U.S. Pat. No. 6,181,115. An improved S4R system is disclosed by FR 2 908 939.

In this Application, the expression "sequential switching shunt regulator" will be intended to cover both the S3R and S4R architectures.

As mentioned above, a sequential switching shunt cell is always provided with a diode connected between the switch and the power bus. This diode is connected in such a way that power can flow from the cell to the power bus, but not vice-versa. Without this diode, the switch would shunt the whole power bus, and not only one power source, when closed.

In many applications - and particularly in space application, where this kind of regulator is most often used - it is essential to ensure that a single failure cannot result in a significant loss of operation. A short-circuit failure of the diode of a single S3R (S4R) cell would result in a total loss of operation (and mission): for this reasons, two diodes connected in series are generally used in order to provide with redundancy. Note that an open circuit failure only leads to the loss of a single power source, which might be acceptable if at least one spare S3R cell and solar array generator section are provided; for this reason, parallel redundancy can be dispensed with.

Unfortunately, the use of two diodes connected in-series between each power source and the power bus reduces the power efficiency of the system. The increase in power dissipation hinders miniaturization of the regulator and requires bulky and heavy heat sinks. These are major drawbacks, especially for space application.

The invention aims at avoiding this drawback of the prior art.

According to the invention, this result is achieved by providing a sequential switching shunt regulator cell comprising:
  a power line for connecting a power source to a power bus;
  a shunting switch for shunting said power line;
  driving means for opening or closing said shunting switch depending on an error signal indicative of a voltage level of said power bus;
  said cell being characterized in that it also comprises:
  a non-redundant rectifier connected in series to said power line for disconnecting the power bus from the shunting switch when the latter is closed; and
  a fault detector for detecting a short-circuit fault condition of said non-redundant rectifier, and for opening the shunting switch in reply to said condition.

The use of a non-redundant rectifier increases the power efficiency of the regulator and reduces dissipation. In the event of a short-circuit failure of said rectifier, the fault detector is activated and forces the switch in its open state.

Activation of the fault detector cannot be instantaneous: in case of short-circuit fault of the diode, the power bus is actually shunted for a short time (a few microseconds). Therefore, a current limiter is advantageously provided, connected in series to the shunting switch, in order to avoid excessive heating of the switch during this time.

Several different embodiments for the fault detector can be devised, and some of them will be described hereafter. For example, activation of the current limiter (or its activation time exceeding a preset threshold) can trigger fault detection. More advantageously, the fault detector can monitor the voltage levels of the power line and of an output signal of the driving means of the shunting switch in order to detect a short-circuit fault. For example, a short-circuit fault can be detected when the power line voltage maintains a high value for at least a preset time while said driving means are driving said shunting switch closed. This is based on the fact that, in normal operation, the power line voltage maintains a high value for a very short duration after the closure of the switch.

In a preferred embodiment of the invention, however, a short-circuit fault condition is detected when the power line maintains a high voltage value during the whole duration of a switching cycle of the shunting switch.

An even greater increase in power efficiency can be obtained by using a synchronous rectifier in replacement of the diode. A cell comprising a redundant synchronous rectifier (i.e. two synchronous rectifier is series) would still have better power performances than one with a single (non-redundant) diode. However, the non-redundant approach of the invention is advantageous even in the case of synchronous rectification, because providing two independent synchronous rectifiers with the associated driving circuits would lead to an inacceptable increase of the circuit complexity and cost.

Another object of the invention is a solar power regulator comprising a plurality of solar arrays connected to a power bus through respective sequential switching shunt regulator cells as described above.

Different embodiments of the invention constitute the object of the appended dependent claims.

Figure 2:
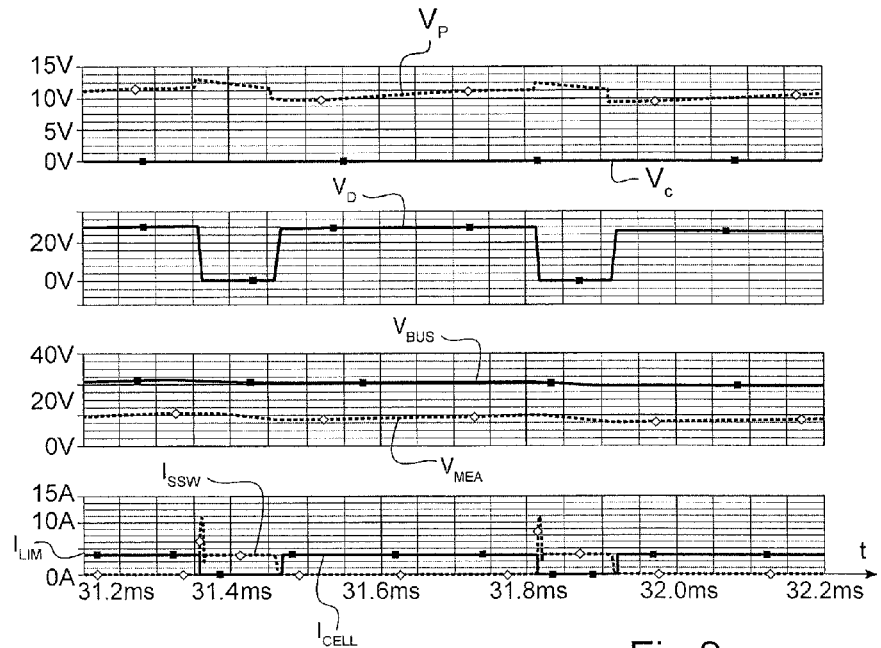
Figure 3:
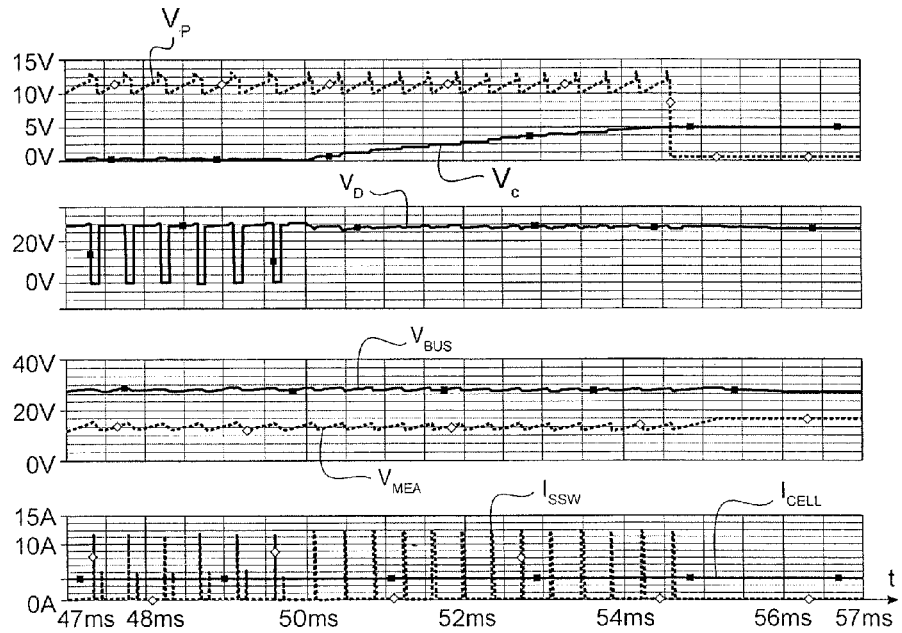
Figure 4:
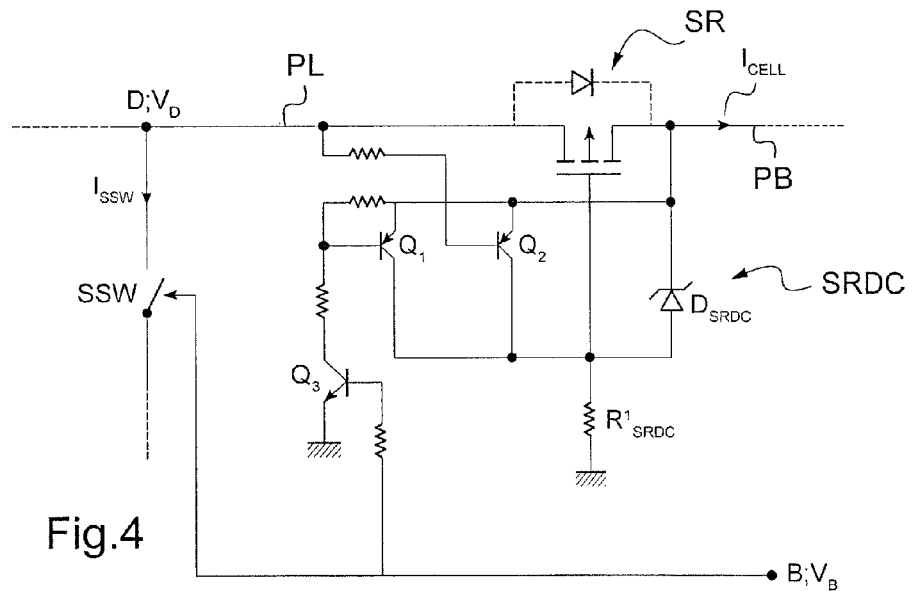
Figure 5:
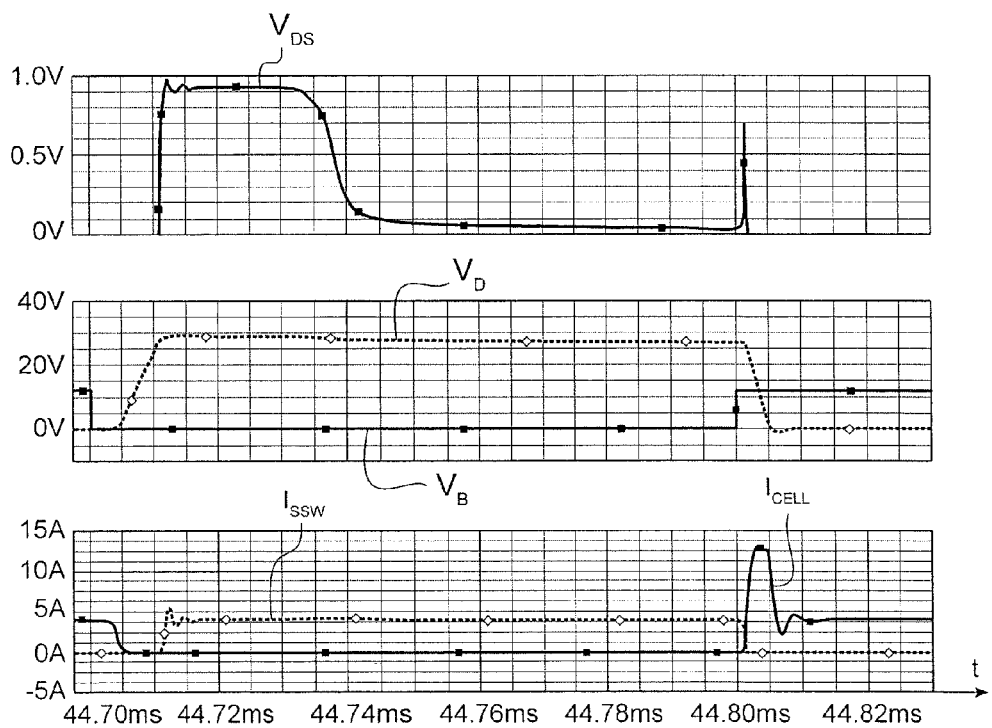
Figure 6:
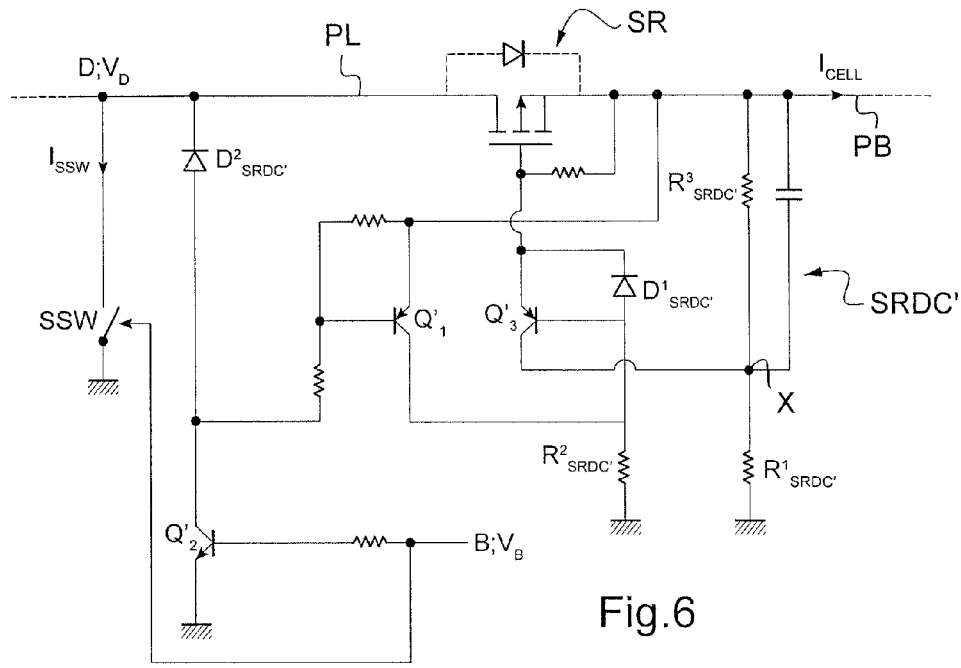
Figure 7:
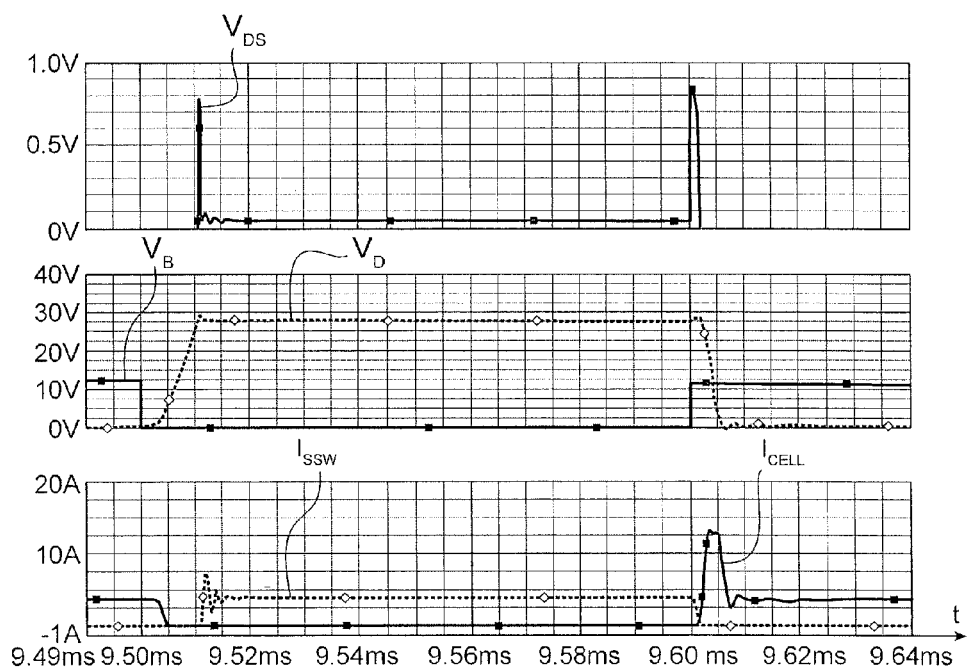

Additional features and advantages of the present invention will become apparent from the subsequent description, taken in conjunction with the accompanying drawings, which show:

FIG. 1, a simplified circuit scheme of a sequential switching shunt cell according to an embodiment of the invention;

FIG. 2, a set of time plots illustrating the operation of the cell of FIG. 1 in nominal conditions;

FIG. 3, a set of time plots illustrating the operation of the cell of FIG. 1 in fault conditions;

FIG. 4, a scheme of a synchronous rectifier and of the associated driving circuit to be used in an alternative embodiment of the invention;

FIG. 5, a set of time plots illustrating the operation of the synchronous rectifier of FIG. 4;

FIG. 6, a scheme of a synchronous rectifier and of the associated driving circuit to be used in a further alternative embodiment of the invention; and FIG. 7, a set of time plots illustrating the operation of the synchronous rectifier of FIG. 6.

On FIG. 1 it is possible to identify the usual components of a sequential switching shunt (S3R) cell known from the prior art:

- a power line PL connecting a solar array SA (modeled by a current generator in parallel to a capacitor $C_S$) to a power bus PB (modeled by a load resistor $R_L$ in parallel to a capacitor $C_B$);
- a power MOSFET implementing a shunting switch SSW, whose drain is connected to the power line and whose source is connected to ground (through a current limiter, but this will be discussed later);
- a diode D3 for disconnecting the power bus from the shunting switch when the latter is closed (note, however, that in typical prior art cells there are two such diodes connected in series); and
- driving means DM for driving the shunting switch SSW.

The driving means DM are basically constituted by a hysteresis comparator (or Schmitt's trigger) U1, R9, R10 whose output is connected to the gate of the MOSFET SSW and whose inputs are labeled MEA and MEAR.

MEA is the output signal of the so-called "Mean Error Amplifier", and is representative of the voltage level $V_{BUS}$ of the power bus PB (or, more precisely, of the difference between said voltage level and a reference voltage). The higher is $V_{BUS}$, the higher is the MEA voltage value $V_{MEA}$. In most implementations, actually, the "Mean Error Amplifier" has a proportional-integrating behavior, meaning that $V_{MEA}$ increases linearly while $V_{BUS}$ is constant in case that bus voltage Vbus differs from said reference voltage. This ensures a more accurate regulation.

MEAR is a constant reference value, different for each S3R cell of a given power system.

It can be easily understood that when $V_{MEA}$ becomes greater or equal than MEAR+$\delta_+$, the output of the comparator $U_1$ goes high (at $V_{CC}$) and turns the MOSFET SSW ON; when $V_{MEA}$ becomes equal or lower than MEAR−$\delta_-$, the output of the comparator $U_1$ goes low (typically at 0 V: symmetrical voltage supplies are usually avoided in S3R designs for space applications as they would introduce additional complexity) and turns the MOSFET SSW off. The values of $\delta_+$, $\delta_-$ depend on $R_1$, $R_2$ and on the supply voltages of U1.

As long as SSW is open, power flows from the solar array to the power bus, and the voltage of point D is $V_D=V_{BUS}+V_{D3}$, where $V_{D3}\cong0.7$ V is the voltage drop across the diode D3.

When SSW closes, the solar array is shunted, the current $I_{SA}$ it generates flows through the MOSFET and the capacitor $C_S$ discharges. Then $V_D$ decreases and the diode $D_3$ eventually becomes reversely polarized, disconnecting the power bus from the solar array.

As discussed above, in a S3R cell belonging to a solar power system, switch SSW is either continuously open, continuously closed, or switching at a frequency of a few kHz in order to regulate the value of $V_{BUS}$.

In the circuit of FIG. 1, the source of the MOSFET SSW is not directly connected to the ground, but to a current limiter CL, comprising bipolar transistor $T_1$ and resistor $R_{CL}$. All the current $I_{SSW}$ flowing through SSW also flows through $R_{CL}$ inducing a base-emitter voltage difference $V_{BE}=I_{SSW}\cdot R_{CL}$. When $V_{BE}$ reaches a value of about 0.7 V, the transistor starts conducting; a current flows through its collector, lowering the voltage applied to the gate of SSW (due to resistors $R_7$, $R_8$), bringing the MOSFET into its linear region. It can be shown that this ensures that $I_{SSW}$ cannot exceed a preset value $I_{SSW}^{MAX}$. Typically $I_{SSW}^{MAX}\cong 2I_{SA}$ in order to ensure that $I_{SSW}^{MAX}>I_{SA}$ despite parameter drifts.

In nominal conditions (i.e. as long as all the components work correctly), the current limiter CL is activated for a very short time when SSW turns on, at the beginning of the discharge of $C_S$. In the event of short-circuit failure of the diode D3, CL is also activated for a slightly longer time, before activation of the fault detector FD.

It is important to note that the current limiter could not deal alone, without fault detector, with a short-circuit failure of D3: activation of the current limiter brings SSW into its linear region, where dissipation is high. This condition can only be sustained for a limited time.

For more information on current limiting techniques is S3R cells, see the paper "Current Limitation Techniques in a S3R Power Cell" by C. Delepaut and M. Martin, Proceedings of the European Space Power Conference, Graz, Austria, 23-27 Aug. 1993, pages 61-66.

The fault detector FD detects a short-circuit fault of the diode $D_3$ and reacts by forcing SSW open, independently of the value of the MEA signal.

There is not a single way to design the fault detector. However, many seemingly promising schemes turn out to be impractical or difficult to implement. This is because it is not easy to distinguish between a failure condition and a transient which can occur in nominal operation.

A first possibility would be to rely, for fault detection, on current limitation timing.

As discussed above, in nominal operation the current limiter is activated for a short time $\tau_{nom}$ (a few microseconds) during the discharge of the solar array inner capacity $C_S$. Instead, in failure condition, the current limiter is activated as long as SSW is closed, i.e. for a longer time $\tau_{fault}$. Therefore, it would be possible to design a fault detector which opens the switch SSW if the current limiter remains activated for a time $\tau_{delay}$ comprised between $\tau_{nom}$ and $\tau_{fault}$.

The problem is that the interval $\tau_{fault}$-$\tau_{nom}$ turns out to be rather small (1-2 μs for typical applications) making the system very sensible to parameter drifts. This is due to the fact that a short circuit failure increases the switching frequency of SSW, reducing $\tau_{fault}$. This can be easily understood: when $V_{MEA}>$MEAR+$\delta_+$, SSW closes, shunting the power bus: $C_B$ discharges through SSW and the current limiter, $V_{BUS}$ and $V_{MEA}$ decrease; after a few microseconds, $V_{MEA}$ becomes lower than MEAR−$\delta_-$, SSW opens, $V_{BUS}$ and $V_{MEA}$ start increasing again and so on. In nominal condition, the decrease of $V_{BUS}$ and $V_{MEA}$ is much slower (the power bus is not shunted), therefore the open-closed cycle has a lower frequency.

The robustness of a fault detector based on current limiter timing could be improved by using two separate current limiters: a "Miller capacity" one, for limiting the peak current due to discharge of $C_S$; and an "active" limiter CL (e.g. of the kind illustrated on FIG. 1) set at a higher current level, which is reached only in failure conditions. The "Miller capacity" limiter is simply constituted by a capacitor $C_M$ connected between the gate and the drain of SSW, simulating an increase of the Miller capacity of the MOSFET which slows its commutation down. When the gate voltage goes up, SSW remains in linear mode for quite a long time, until $C_M$ voltage reaches its steady state; during this time, $I_{SSW}$ cannot exceed a maximum value. The drawback of this technique is that $C_M$ has to be dimensioned for each specific application; parametric drifts (initial tolerance, temperature, ageing, radiation) can also be a problem. This extremely simple limiter can deal with the peak current in nominal operation, but not with the higher current level associated with a failure. Therefore, in a system of this kind, a failure would be detected whenever the "active" limiter is triggered. The problem is that also the simple limiter illustrated on FIG. 1 is affected by significant parametric drifts (initial tolerance, temperature, ageing, radiation). In order to ensure robust operation of this fault detection scheme it would be necessary to use a much more complex limiter.

An alternative approach consists in detecting a short-circuit failure of $D_3$ when both the drain (point D on FIG. 1) and the gate (point B on FIG. 1) voltage of SSW are high, at $V_{BUS}$ and $V_{CC}$ respectively. Nevertheless, this condition is also verified in nominal operation during the discharge of the $C_{SA}$ capacitance.

In a naïve approach, it would seem necessary to introduce a delay after the detection before acting on the tripping-off comparator. This delay time would have to be longer than the duration of the $C_S$ capacitance discharge and shorter than the SSW MOSFET ON time in failure mode. Otherwise, SSW would not be tripped off. Thereby, the situation would be more or less the same as in the Current Limitation Timing solution described above.

The present inventors, however, have found a way to circumvent this limitation. This is based on the observation that it is not necessary to activate the fault detector within a single cycle of the SSW switch. Instead, it is possible to allow the fault detector to "monitor" the voltage levels at B and D over a few cycles before determining that a fault has actually occurred.

For example, it is possible to design a circuit wherein:
a capacitor is charged when both "B" and "D" are high;
said capacitor is discharged relatively quickly when "D" goes low and B is high;
the capacitor is discharged very slowly when "D" is high and "B" is low.

In nominal operation, "B" and "0" are simultaneously high for a short time (just after the closure of SSW), then "D" goes low: the said capacitor is charged a little, then it discharges quickly. When "B" goes low, "D" goes up, but this has no effect on the capacitor, which was already fully discharged. Therefore, at the end of each switching cycle, the capacitor is completely discharged.

In failure mode, "B" and "0" are simultaneously high for a longer time, therefore the capacitor is charged up to a higher voltage. If the diode $D_3$ fails in short circuit, "D" remains connected to the power bus and it never goes low, despite the closure of SSW. At the end of the switching cycle (which is shorter than in nominal conditions) "B" goes low and the capacitor start discharging, but at a slow rate, through the high-value resistor $R_4$. Before the end of the discharge, "B" goes up again. Therefore, at the end of each cycle, the capacitor is more charged than at the beginning.

The voltage across the capacitor builds up over successive cycles, up to the point where it is high enough to force the switch SSW open. What is important, for charging the capacitor, is that "D" never goes low, during the whole switching cycle of SSW.

On FIG. 1, a possible implementation of this approach is illustrated.

The fault detector FD is built around an open-collector comparator $U_2$. The output of this comparator is at high impedance (an "open circuit") when its positive input is higher than the negative output (i.e. when $V_A>V_{REF}$) and a low impedance (a "short circuit") connected to the ground when its negative input is higher than the positive output (i.e. when $V_A<V_{REF}$). Due to the presence of diode $D_1$, the voltage at point A ($V_A$) can only rise when the voltage at D (i.e. the voltage level of the power line) rises. Capacitor $C_1$ is introduced in order to avoid a transient raise of $V_A$ (and therefore of $V_C$) when SSW closes while $V_D$ is still high due to the $C_S$ capacity. This capacitor is not essential, but it increases the robustness and noise immunity of the fault detector.

The output C of comparator $U_2$ is connected to the output B of the S3R main comparator $U_1$ by resistor $R_3$ and diode $D_2$, and to the ground by the parallel connection of capacitor $C_2$ and resistor $R_4$. Resistors $R_3$ and $R_4$ are chosen in such a way that $R_3 \ll R_4$. Therefore:
when $V_A>V_{REF}$ and $V_B=V_{CC}$ (i.e. the output of $U_1$ is high, indicating that SSW is closed, or is closing) the output of $U_2$ is an open circuit and $C_2$ can charge through $R_3$;
when $V_A>V_{REF}$ but $V_B=0$ (i.e. the output of $U_1$ is low, indicating that SSW is open, or is opening), and $C_2$ discharges slowly through $R_4$;
when $V_A<V_{REF}$, then the output of $U_2$ is a short circuit to the ground, through which $C_2$ discharges quickly.

Operation of this circuit in nominal conditions will be better understood with the help of FIG. 2.

When the SSW switch is open, $V_D$ is high; as the power generator SA feeds the power bus, $V_{BUS}$ raises, and so do $V_D$ (as the diode $D_3$ is conducting) the MEA voltage value, $V_{MEA}$, and $V_P$. When $V_P$ crosses a first threshold, the hysteresis comparator $U_1$ is triggered, its output $V_B$ goes high and the SSW switch closes, discharging the capacitor $C_S$. Then $V_D$ goes low, $D_3$ becomes reversely polarized and the current $I_{CELL}$ flowing from the S3R cell to the power bus falls to zero. All the current generated from the power generator SA flows through the SSW switch; it can be seen that the current $I_{SSW}$ through SSW experiences a peak due to the fast discharge of $C_S$; this peak is limited by the active current limiter CL and/or by the "Miller capacity" CM and/or by a parallel R-L connection connected in series to the switch (also represented on FIG. 1).

Capacitor $C_2$ can only charge while both $V_B$ and $V_D$ are high. This is a transient condition, verified for a few microseconds immediately after the switching of $U_1$; therefore, $V_C$ only experiences a negligible raise, or no raise at all due to the filtering action of capacitor $C_1$. Then $V_D$ goes low, and so does $V_A$; the output of the $U_2$ comparator becomes a short circuit to ground and therefore $C_2$ is completely discharged.

The power generator SA being shunted, the power bus $V_{BUS}$ starts a slow decrease, and so do $V_{MEA}$, and $V_P$. When $V_P$ crosses a second threshold, the hysteresis comparator $U_1$ switches again, its output $V_B$ goes low and the SSW switch opens, directing the current issued by the generator SA toward the power bus ($I_{SSW}$ goes to zero, $I_{CELL}$ goes high). The diode $D_3$ conducts again and $V_D$ goes high. Therefore, also $V_A$ can goes high, and the output of $U_2$ becomes an open circuit; but $C_2$ cannot charge because $V_B$ is low and $D_2$ does not conduct.

The SSW switch being open, $V_{BUS}$ can start rising again, and a new cycle begins. At every cycle, $U_2$ shunts the $C_2$ capacity to ground, therefore $V_C$ never grows.

FIG. 3 shows what happens in failure conditions. Up to t=50 ms, the S3R cell operates nominally (note the different time scale with respect to FIG. 2). At t=50 ms, the diode $D_3$ is shorted. The immediate consequences are that:

$V_D$ now follows $V_{BUS}$, as the power line of the S3R cell is continuously connected to the power bus;

transients of $I_{SSW}$ are stronger; however, the current limiter stabilizes $I_{SSW}$ at $I_{LIM}$;

when SSW is closed, the bus capacitor $C_B$ discharges through it and the current limiter; therefore $V_{BUS}$ decreases faster than in nominal operation; as a consequence, the switching cycle of the S3R cell is also faster.

Now, $V_D$ is always "high"; therefore, the output of the open-corrector comparator $U_2$ is permanently an open circuit, and never allows quick discharge of $C_2$. This capacitor charges through $R_3$ when $V_B$ is high, and discharges—but very slowly—through the high-value resistor $R_4$. Therefore $C_2$ is charged progressively over successive switching cycles, and $V_C$ increases until it reaches a predetermined threshold, indicating that a short-circuit failure of $D_3$ has been detected.

$V_C$ is applied to the "set" input S of a bistable cell, or memory cell, BC. When $V_C$ reaches said threshold, the bistable cell is triggered and its output Q goes high, pulling down the input P of the $U_1$ comparator through transistor $T_2$. This causes SSW to be opened, independently from the value of $V_{MEA}$, and to remains open.

The power of the S3R cell will then be transferred to the power bus continuously. Of course, the power system shall have been designed in such a way that this situation does not result in a main bus over-voltage (either by ensuring a minimum load greater that one S3R generator section capability, or by providing a power dumper to be commanded by the fault detector).

In case of spurious activation of the protection, and assuming that another S3R cell with the same protection has already reacted to an actual short-circuit fault, this might result in excess of power transferred to the power bus. In this condition, $V_{BUS}$ would rise, and $V_{MEA}$ would rise much faster due to the integrating nature of the main error amplifier.

When $V_{MEA}$ becomes greater than a preset threshold, the bistable cells BC are reset. Also the memory cell of the S3R with the actual diode failure would be reset, but since the error voltage in this case will re-enter the normal dynamic range of the shunt domain, the fault condition would re-trigger again the relevant memory cell after the delay defined by the resistors $R_3$ and $R_4$, the diode $D_2$, and the capacitor $C_2$.

A complete S3R regulator comprises a plurality of S3R cells with different MEAR values. The cells with MEAR<$V_{MEA}$ are shunted, those with MEAR>$V_{MEA}$ are connected to the bus, one cell switches between the two conditions to ensure bus voltage regulation. In these conditions, the threshold for reset of the bistable cell is chosen (slightly) higher than the highest MEAR value.

Let us consider a S3R regulator having a bus voltage $V_{BUS}$=28V and an $I_{SA}$=5A; let us assume that the voltage drop across $D_3$ (in conducting mode) is equal to 0.7 V.

If two diodes were present, the power generator should provide $V_{SA}$=28+2×0.7=29.4V, and $I_{SA}V_{SA}$=147 W. The two diodes would dissipate 7 W, i.e. 4.76% of the power generated.

The invention allows using a single diode, therefore $V_{SA}$=28.7V and $I_{SA}V_{SA}$=143.5W. The power dissipated by the diode is 3.5 W, i.e. only 2.44% of the power generated.

Considering that a typical power system comprises several cells, and several generators, the efficiency gain provided by the invention can be quite substantial.

An even greater power gain can be obtained by replacing the non-redundant diode $D_3$ by a synchronous rectifier, i.e. a switch such as a MOSFET which is actively turned on or off in order to ensure a one-directional current flow from the generator to the power bus.

FIG. 4 illustrates such a synchronous rectifier, SR, and the associated driving circuit SRDC. As synchronous rectifiers are well-known by themselves, only a concise description of the operation of SRDC will be provided here, with the help of the plots of FIG. 5. Note that, in an actual implementation of SRDC, the Zener diode $D_{SRDC}$ should preferably made redundant by replacing it by two Zener diodes in parallel, and resistor $R_{SRDC}^1$ should preferably be "decomposed" in two separate resistors connected in series. This is needed to cover failure modes at component level.

When $V_B$ (output of the main comparator $U_1$) is high, the $Q_1$ and $Q_3$ BJT are saturated, and the SR gate-source voltage is zero. Therefore, SR does not conduct, and its drain-source voltage $V_{DS}$ is approximately equal to –$V_{BUS}$ (negative values not represented on the plot of FIG. 5). As SR does not conduct while SSW does, $V_D$ becomes low and $Q_2$ saturates, too.

When $V_B$ turns low, $Q_1$ and $Q_3$ turn off, and $V_D$ start rising thanks to the opening of SSW. $Q_2$ remains saturated until $V_D$ catch up $V_{BUS}$, minus a $V_{BE}$ (base-emitter) drop of approximately 0.7V. At this point, $Q_1$, $Q_2$ and $Q_3$ being off, the gate voltage of SR can decrease. SR is then driven in its Ohmic region and starts conducting. As long as the MFET contained in the SR is not conducting (between 44.71 ms and 44.735 ms on FIG. 5), there is a voltage drop of approximately 0.9 V across it, due to its body diode (which is conducting: due to its body diode, SR only forbids power flowing from the power bus to the S3R cell, not vice-versa); but as SR enters in its Ohmic region, the voltage drop falls below 0.1V, at about 0.04V.

When $V_B$ turns up again, the cycle restarts.

Neglecting the power loss during transients, and assuming $V_{BUS}$=28V, $I_{SA}$=5A, the synchronous rectifier only dissipates 0.04V×5A=0.2W, i.e. 0.16% of the power generated.

FIG. 6 illustrates an alternative driving circuit SRDC' for a synchronous rectifier SR.

When the output $V_B$ of comparator $U_1$ is high, $Q'_1$ and $Q'_2$ are saturated, and the source-gate voltage of the SR MOSFET is approximately zero, also due to $D^1_{SRDC'}$, which is biased directly. Therefore, SR is not conducting.

As soon as the $V_B$ becomes low, $Q'_2$ turns OFF, but $Q'_1$ keeps being saturated until the voltage at point D is equal to the power bus voltage minus two diode voltage drops (due to $D^2_{SRDC'}$ and the base-emitter voltage drop of $Q'_1$).

When also $Q'_1$ turns OFF, the gate voltage of SR decreases quickly. In fact $Q'_3$ is driven in saturation by the current flowing on $R^2_{SRDC'}$ and connects the gate of SR to the point X, that is kept at approximately 12V by the voltage divider constituted by $R^1_{SRDC'}$ and $R^3_{SRDC'}$. The capacitor in parallel to $R^3_{SRDC'}$ helps lowering the voltage transient at the point X when $Q'_3$ switches.

When its drain-gate voltage reaches threshold, SR itself is driven ON and enters its Ohmic region.

The cycle restarts when $V_B$ becomes high again.

FIG. 7 shows that the voltage drop $V_{DS}$ across RS takes a value of approximately 0.8 V, due to the fact that the body diode conducts before the MOSFET RS itself is driven in its Ohmic region, only for very short time intervals around 9.51 ms and 9.6 ms. By comparison, in the case of the SRDC circuit of FIG. 4, the voltage drop of 0.8 V has to be sustained for a much longer time at each switching cycle. Therefore, the SRDC' circuit allows reducing power losses.

In order to cover failure modes at component level, resistors $R_{SRDC'}^1$ and $R_{SRDC'}^3$ should preferably be "decomposed" in two separate resistors connected in series.

The invention has been described in relation to a S3R regulator cell, but it can also be applied to a S4R cell.

A S4R regulator cell is similar to a S3R, except in that it comprises a second controlled switch for connecting the solar array to the battery. Thus, depending on the power requirements of the systems, the energy generated by the solar array can be directed to the power bus (both controlled switches are open), to the battery (shunt switch open, battery switch closed) or shunted (shunt switch closed). A second pair of serially redundant diodes is provided in series with the battery switch, in order to avoid the risk of shorting the battery if both switches happen to be closed at the same time.

The serially redundant pair of diodes connected in series to the power bus can be replaced by a single rectifier (diode or synchronous rectifier) plus a fault detector and a current limiter acting on the shunt switch, exactly as in S3R case.

The reset of the bistable cell shall be driven by the main bus error voltage (as per the S3R case).

The second pair of serially redundant diodes (the ones in series with the battery) can also be replaced by a single rectifier plus the same fault detector and current limiter acting on the shunt switch.

In fact, in case of short circuit of the diode or of the synchronous rectifier in series with the battery, the overcurrent will be detected across the shunt switch. In this case, the reset of the bistable cell that opens the shunt switch shall be additionally commanded (in logical OR relation) by a battery error voltage, or by a battery charge fault detector, see e.g. FR 2 908 939.

The invention claimed is:

1. A sequential switching shunt regulator cell comprising:
   a power line (PL) for connecting a power source to a power bus;
   a shunting switch (SSW) for shunting said power line;
   driving means (DM) for opening or closing said shunting switch depending on an error signal indicative of a voltage level of said power bus;
   characterized in that it also comprises:
   a non-redundant rectifier ($D_3$) connected in series to said power line for disconnecting the power bus from the shunting switch when the latter is closed; and
   a fault detector (FD) for detecting a short-circuit fault condition of said non-redundant rectifier, and for opening the shunting switch in reply to said condition.

2. A sequential switching shunt regulator cell according to claim 1, further comprising a current limiter (CL) connected in series to the shunting switch.

3. A sequential switching shunt regulator cell according to claim 1, wherein said fault detector comprises means for detecting said short-circuit fault condition by monitoring the voltage levels of the power line ($V_D$) and of an output signal ($V_B$) of said driving means of the shunting switch.

4. A sequential switching shunt regulator cell according to claim 3, wherein said fault detector comprises means for detecting said short-circuit fault condition when the power line maintains a high voltage value during the whole duration of a switching cycle of the shunting switch.

5. A sequential switching shunt regulator cell according to claim 4, wherein said fault detector comprises means for:
   charging a capacitor ($C_2$) when the power line voltage maintains a high value while said driving means are driving said shunting switch closed;
   discharging said capacitor at a first rate when the power line voltage takes a low value;
   discharging said capacitor at a second rate, slower than said first rate, when the power line voltage takes a high value while said driving means are driving said shunting switch open; and
   outputting a driving signal (Q) for opening the shunting switch when the voltage across said capacitor exceeds a preset threshold.

6. A sequential switching shunt regulator cell according to claim 3, wherein said fault detector comprises means for opening the shunting switch when the power line voltage maintains a high value for at least a preset time while said driving means are driving said shunting switch closed.

7. A sequential switching shunt regulator cell according to claim 2, wherein said fault detector comprises means for opening the shunting switch when said current limiter is activated, or when its activation time exceeds a preset threshold.

8. A sequential switching shunt regulator cell according to claim 1 wherein the fault detector is configured for generating, upon detection of said short-circuit fault, a driving signal which is applied to a set port (S) of a bistable cell (BC), one output (Q) of said bistable cell being connected to the driving means of the shunting switch in such a way that, when said output takes a predetermined value, said driving means drive the switch open independently from the voltage level of the power bus.

9. A sequential switching shunt regulator cell according to claim 8, further comprising means for resetting said bistable cell when the voltage level of the power bus exceeds a preset threshold.

10. A sequential switching shunt regulator cell according to claim 1, wherein said non-redundant rectifier is a synchronous rectifier (SR).

11. A solar power regulator comprising a plurality of solar arrays connected to a power bus through respective sequential switching shunt regulator cells according to any of the preceding claims.

* * * * *